United States Patent
Kimura et al.

(10) Patent No.: US 9,699,640 B2
(45) Date of Patent: Jul. 4, 2017

(54) PAIRING APPARATUS

(71) Applicant: FUJITSU LIMITED, Kawasaki-shi, Kanagawa (JP)

(72) Inventors: Masatoshi Kimura, Kawasaki (JP); Akinobu Kawano, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 15/184,673

(22) Filed: Jun. 16, 2016

(65) Prior Publication Data

US 2016/0302054 A1    Oct. 13, 2016

Related U.S. Application Data

(63) Continuation of application No. PCT/JP2013/084717, filed on Dec. 25, 2013.

(51) Int. Cl.
*H04B 7/00* (2006.01)
*H04W 8/00* (2009.01)
(Continued)

(52) U.S. Cl.
CPC ......... *H04W 8/005* (2013.01); *H04M 1/7253* (2013.01); *H04W 4/008* (2013.01); *H04W 88/02* (2013.01)

(58) Field of Classification Search
CPC ..... H04W 8/005; H04W 4/008; H04W 88/02; H04M 1/7253
(Continued)

(56) References Cited

U.S. PATENT DOCUMENTS 8,249,504 B2 *  8/2012  Fujii ...................... H04L 63/08
                                                          455/41.2
2006/0077455 A1  4/2006  Watanabe
(Continued)

FOREIGN PATENT DOCUMENTS

JP    2003-101554    4/2003
JP    2006-109296    4/2006
(Continued)

OTHER PUBLICATIONS

Sony Sound Premium, "One-touch connection", Internet<URL:http://www.sony.jp/soundpremium/onetouch/>, [retrieval date Nov. 18, 2013], partial English translation (5 pages).
(Continued)

*Primary Examiner* — Ping Hsieh
(74) *Attorney, Agent, or Firm* — Fujitsu Patent Center

(57) ABSTRACT

A pairing apparatus includes first and second wireless devices, each of which has a docking mechanism for docking the wireless devices with each other, wherein each of the wireless devices includes a pairing request detecting unit to detect a request for pairing, a docking detecting unit to detect docking of the wireless devices, and a pairing setting unit to perform a pairing setting process for pairing the wireless devices, in response to the request for pairing, wherein a check is made as to whether the wireless devices are in a docked state at both a time of the pressing of the pairing button and a time of the releasing of the pairing button, and the request for pairing is made from one of the wireless devices to the other upon a result of the check indicating that the wireless devices are in the docked state at both of the times.

9 Claims, 12 Drawing Sheets

(51) Int. Cl.
  *H04M 1/725* (2006.01)
  *H04W 4/00* (2009.01)
  *H04W 88/02* (2009.01)

(58) Field of Classification Search
  USPC .................................. 455/41.1, 41.2, 41.3
  See application file for complete search history.

(56) References Cited

U.S. PATENT DOCUMENTS

| | | | |
|---|---|---|---|
| 2008/0070501 | A1* | 3/2008 | Wyld .................. H04L 63/08 455/41.2 |
| 2008/0253772 | A1 | 10/2008 | Katsuyama |
| 2011/0018754 | A1 | 1/2011 | Tojima et al. |
| 2012/0069792 | A1 | 3/2012 | Kishida |

FOREIGN PATENT DOCUMENTS

| | | |
|---|---|---|
| JP | 2007-097009 | 4/2007 |
| JP | 2008-263308 | 10/2008 |
| JP | 2009-027637 | 2/2009 |
| JP | 2009-246487 | 10/2009 |
| JP | 2010-278781 | 12/2010 |
| JP | 2011-101125 | 5/2011 |
| JP | 2012-039282 | 2/2012 |
| JP | 2012-151709 | 8/2012 |
| JP | 2012-175148 | 9/2012 |
| JP | 2012-205251 | 10/2012 |
| WO | 2012099114 | 7/2012 |

OTHER PUBLICATIONS

International Search Report and Written Opinion of the International Searching Authority (Form PCT/ISA/210, Form PCT/ISA/237), mailed in connection with PCT/JP2013/084717 and mailed Mar. 4, 2014 (8 pages).

* cited by examiner

PAIRING APPARATUS

CROSS-REFERENCE TO RELATED APPLICATIONS

This application is a continuation application of International Application PCT/JP2013/084717, filed on Dec. 25, 2013 and designated the U.S., the entire contents of which are incorporated herein by reference.

FIELD

The disclosures herein relate to a pairing apparatus, a pairing method, and a recording medium having a pairing program stored therein.

BACKGROUND

The technology is known in the art that allows pairing, connection, and disconnection to be made according to the BLUETOOTH (trademark) standard when a user performs a one-touch operation by touching a headphone or speaker having the NFC (near field communication) function with a smartphone having the NFC function (see Patent Document 1, for example).

Methods for pairing wireless devices include a push-button method, a PIN (personal identification number) entry method, and a barcode scan method, for example. In the push-button method for pairing a wireless device A with a wireless device B, for example, a user pushes physical buttons provided on both the wireless device A and the wireless device B within a certain time period to perform pairing.

In place of physical buttons, application buttons (i.e., software buttons) installed in both the wireless device A and the wireless device B may be used in the push-button method. In such a case also, a user pushes software buttons displayed on both the wireless device A and the wireless device B within a certain time period to pair the wireless device A with the wireless device B. A similar pairing method may be performed by providing a physical button in one of the wireless device A and the wireless device B and by installing a software button in the other one of the devices.

The PIN entry method pairs the wireless device A with the wireless device B by entering a PIN code generated by one of the wireless device A and the wireless device B into the other one of the wireless devices. In the barcode scan method, a barcode generated by one of the wireless device A and the wireless device B is displayed as a 2-dimensional barcode, and the other one of the wireless devices takes a picture of the barcode with a camera or the like, thereby pairing the wireless device A with the wireless device B.

The push-button method requires that a physical button or software button be provided in each of the wireless device A and the wireless device B. Further, a user is required to push the buttons on both the wireless device A and the wireless device B within a certain time period. In so doing, it may take time for the user to locate the buttons on the wireless device A and the wireless device B. In the case of the PIN entry method and the barcode scan method, a user is required to enter a PIN code or to scan a barcode.

[Non-Patent Document 1]
<http://www.sony.jp/soundpremium/onetouch/>
[Patent Document 1] Japanese Laid-open Patent Publication No. 2003101554

[Patent Document 2] Japanese Laid-open Patent Publication No. 2012151709
[Patent Document 3] Japanese Laid-open Patent Publication No. 200927637
[Patent Document 4] Japanese Laid-open Patent Publication No. 2006109296

SUMMARY

According to an aspect of the embodiment, a pairing apparatus includes first and second wireless devices, each of which has a docking mechanism for physically docking the first and second wireless devices with each other, wherein each of the first and second wireless devices includes a processor and a memory configured to store a program, wherein the processor is configured to execute the program to perform functions of a pairing request detecting unit configured to detect a request for pairing, the request for pairing including pressing of a pairing button and releasing of the pairing button, a docking detecting unit configured to detect docking of the first and second wireless devices, and a pairing setting unit configured to perform a pairing setting process for pairing the first and second wireless devices, in response to the request for pairing, wherein a check is made as to whether the first and second wireless devices are in a docked state at both a time of the pressing of the pairing button and a time of the releasing of the pairing button, and the request for pairing is made from one of the first and second wireless devices to the other one of the first and second wireless devices upon a result of the check indicating that the first and second wireless devices are in the docked state at both of the times.

According to an aspect of the embodiment, a method for pairing first and second wireless devices, each of which has a docking mechanism for physically docking the first and second wireless devices with each other, including detecting a request for pairing at each of the first and second wireless devices, the request for pairing including pressing of a pairing button and releasing of the pairing button, detecting docking of the first and second wireless devices at each of the first and second wireless devices, performing, at each of the first and second wireless devices, a pairing setting process for pairing the first and second wireless devices, in response to the request for pairing, and making a check as to whether the first and second wireless devices are in a docked state at both a time of the pressing of the pairing button and a time of the releasing of the pairing button, and making the request for pairing from one of the first and second wireless devices to the other one of the first and second wireless devices upon a result of the check indicating that the first and second wireless devices are in the docked state at both of the times.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

In the following, embodiments of the present invention will be described with reference to the accompanying drawings. In the specification and drawings, elements having substantially the same functions or configurations are referred to by the same numerals, and a duplicate description thereof will be omitted.

[Introduction]

In the following, a description will be given of an embodiment of a pairing apparatus for pairing first and second wireless devices. The first and second wireless devices are subjected to pairing. As will be described later, the pairing of the first and second wireless devices may be performed for Wi-Fi (trademark) setup.

In the present embodiment, the first wireless device may be a personal computer (hereinafter referred to as a PC), for example. The second wireless device may be a portable wireless display (hereinafter referred to as a display), for example. It may be noted that the first and second wireless devices are not limited to a PC and a display, and may be any type of devices having a wireless communication function. For example, the first wireless device may be a main device, and the second wireless device is a portable device. Alternatively, both of the devices may be portable devices.

A PC is paired with a display before shipment from the factory. A user thus does not have to perform pairing after purchasing the product. The PC or the display may subsequently need to be replaced due to malfunction or the like. In such a case, the user needs to perform pairing with respect to the PC and the display.

Figure 1:
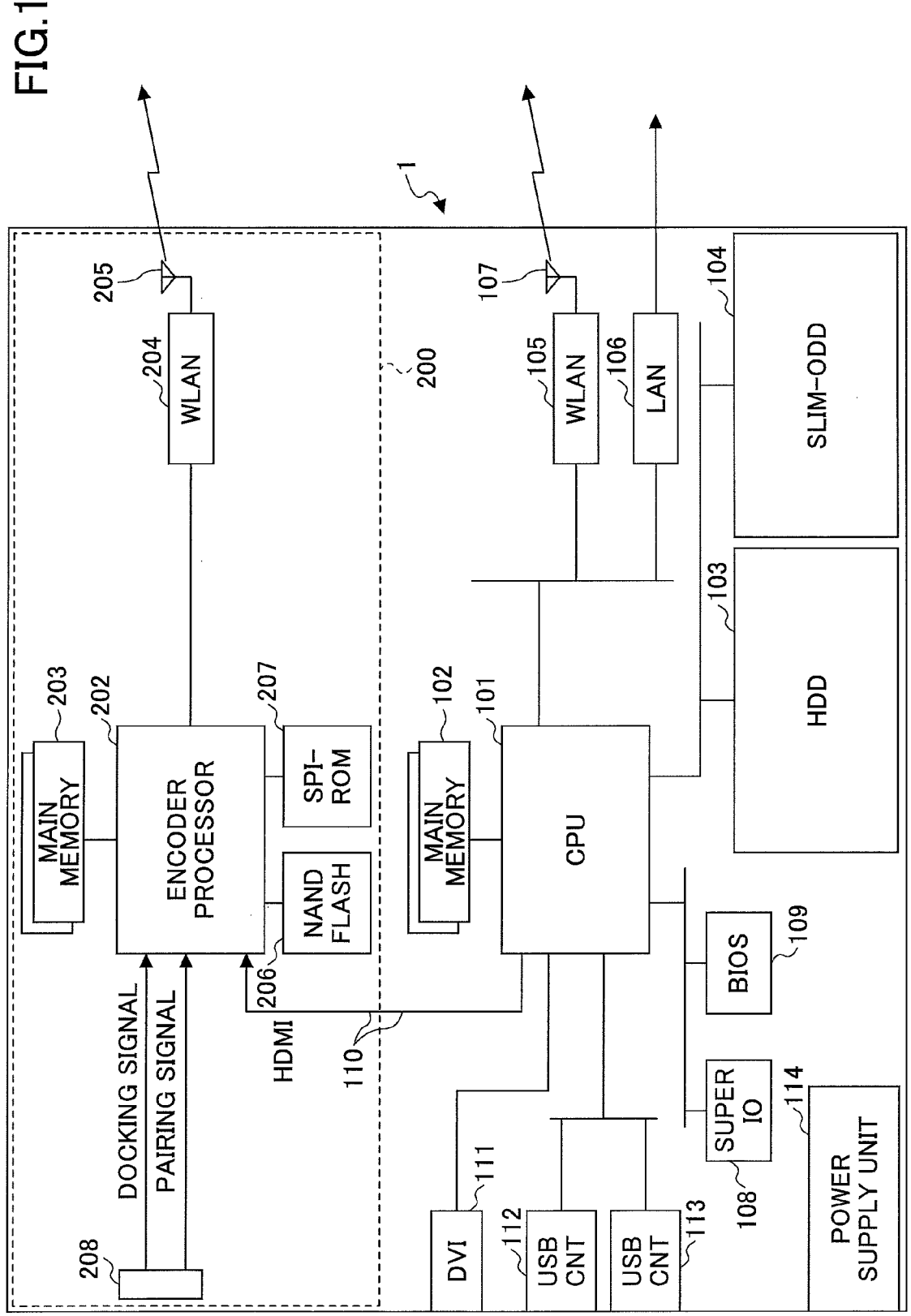
FIG. 1 is a drawing illustrating an example of the hardware configuration of a PC according to an embodiment.
Figure 2:
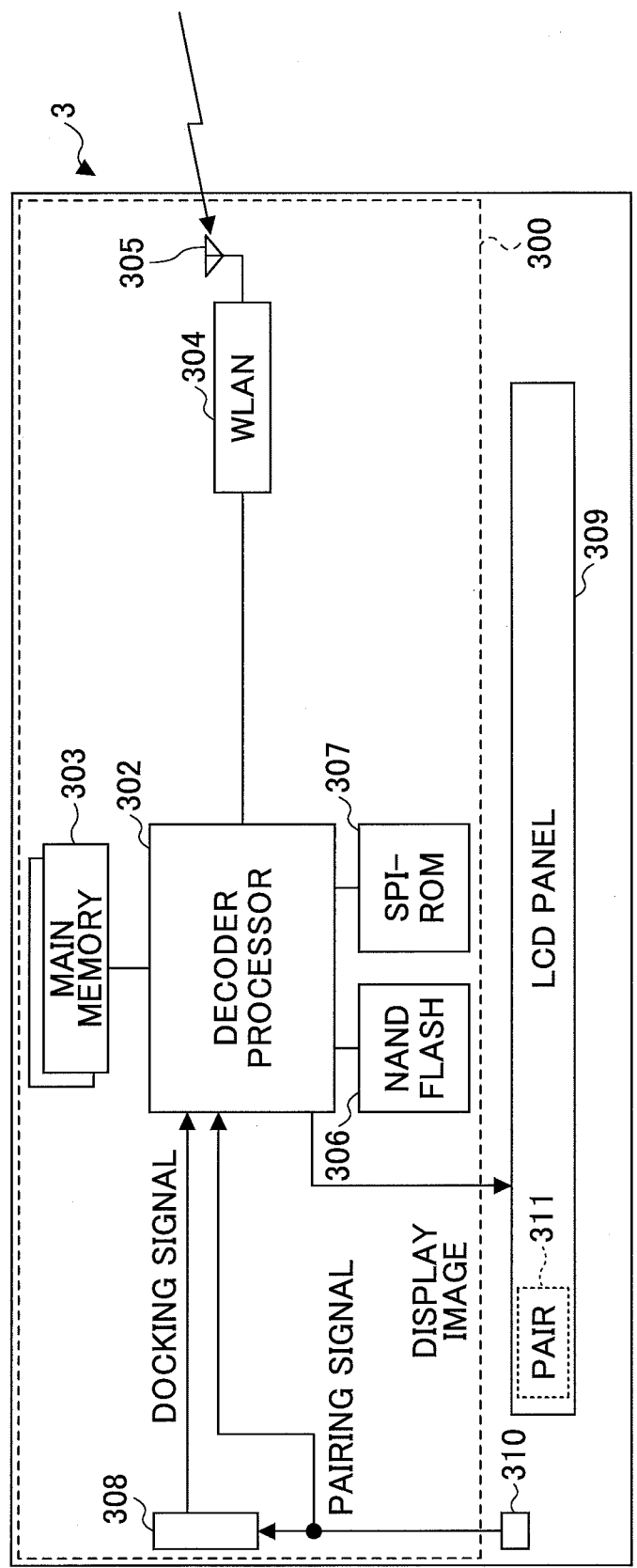
FIG. 2 is a drawing illustrating an example of the hardware configuration of a display according to an embodiment.

The following embodiment will be directed to an example in which a PC 1 illustrated in FIG. 1 is paired with a display 3 illustrated in FIG. 2 in such a situation as described above. A pairing apparatus for pairing the PC 1 with the display 3 is implemented as the function of a wireless device 200 embedded in the PC 1 and the function of a wireless device 300 embedded in the display 3. The wireless device 200 may be an IC chip embedded in the PC 1. The wireless device 300 may be an IC chip embedded in the display 3. In the present embodiment, the wireless devices 200 and 300 are implemented by use of hardware. Alternatively, the wireless devices 200 and 300 may be implemented by use of software.

In the pairing apparatus of the following embodiment, the wireless device 200 of the PC1 serves as a transmission-end device configured to transmit image data generated by the PC 1, and the wireless device 300 of the display 3 serves as a reception-end device configured to receive the image data transmitted from the wireless device 200. The PC 1 serves as an access point (i.e., AP) while the display 3 serves as a station (i.e., STA). The pairing apparatus of the present embodiment allows user operations to be streamlined when linking (pairing) the access point with the station. Specifically, one pairing button is provided in either the PC 1 or the display 3, which enables the user to request pairing by performing a single button operation. The wireless devices 200 and 300 are provided with a docking mechanism, which allows an operation on the pairing button, i.e., a pairing request by a user, to be effective only when the wireless devices 200 and 300 are physically connected with each other.

In the following, a description will first be given of the hardware configuration of the PC 1 including the wireless device 200. A description will then be given of the hardware configuration of the display 3 including the wireless device 300. Thereafter, the functional configurations and operations of the wireless devices 200 and 300 for performing pairing will be described. The configurations and operations of the wireless devices 200 and 300 which will be described are examples of the configurations and operations of the first wireless device as exemplified by the PC 1 and the second wireless device as exemplified by the display 3.

[Hardware Configuration of PC 1 Including Wireless Device 200]

A description will first be given of the hardware configuration of the PC 1 including the wireless device 200 according to the embodiment by referring to FIG. 1. FIG. 1 is a drawing illustrating an example of the hardware configuration of the PC 1 including the wireless device 200 according to the present embodiment.

The PC 1 of the present embodiment includes a CPU (central processing unit) 101, a main memory 102, an HDD (hard disk drive) 103, and a Slim-ODD (optical disk drive) 104. The PC 1 further includes a WLAN 105, a LAN 106, an antenna 107, and a Super-IO (input/output) 108. The PC 1 further includes a BIOS (basic input output system) memory 109, an HDMI (High Definition Multimedia Interface) 110, and a DVI (Digital Visual Interface) 111. The PC 1 further includes a USBCNT (Universal Serial Bus controller) 112, a USBCNT 113, and a power supply unit 114. The PC 1 of the present embodiment is embedded with the wireless device 200.

The CPU 101 is an example of a processing circuit in the PC 1. The main memory 102, the HDD 103, and the Slim-ODD 104 are coupled to the CPU 101 via buses. Further, the WLAN 105, the LAN 106, the Super-IO (input/output) 108, the BIOS memory 109, the HDMI 110, the DVI 111, the USBCNT 112, and the USBCNT 113 are coupled to the CPU 101 via buses. The WLAN 105 is coupled to the antenna 107. The power supply unit 114 supplies power to each unit such as the CPU 101. In FIG. 1, the illustration of a power supply line extending from the power supply unit 114 to each unit is omitted.

The HDD 103 is a nonvolatile storage device that stores programs and data. The programs and data stored therein include an OS (i.e., operating system) that is a basic software unit for the overall control of the apparatus, and also include application software units for providing various functions on the OS. The HDD 103 stores the OS, installed application programs, an uninstaller, registries, and so on.

The Slim-ODD 104 may be an optical disk drive. Application programs, update-purpose data, or the like may be distributed in optical disks. In such a case, the Slim-ODD 104 reads data from the optical disk for storage in the HDD 103 or the like.

The WLAN 105 performs wireless communication via the antenna 107. The WLAN 105 is connected via a router to a network such as the Internet to exchange data with a remote apparatus. Similarly, the LAN 106 is connected to a network such as the Internet to exchange data with a remote apparatus. Application programs, update-purpose data, or the like for distribution may be downloaded via the WLAN 105 or the LAN 105, for example.

The Super-IO 108 is an input and output interface. A keyboard and a mouse, for example, may be coupled to the Super-IO 108. The BIOS memory 109 is a nonvolatile memory device that stores programs (e.g., BIOS programs) for controlling a disk drive, a keyboard, a video card, and the like connected to the computer.

The HDMI 110 is an interface for transmitting digital video and audio. In the present embodiment, image data and the like stored in the PC 1 are transferred from the PC 1 to the wireless device 200 via the HDMI 110. The DVI 111, which may be connected to a monitor, is an interface for outputting image data or the like stored in the PC 1 to the monitor.

The USBCNT 112 and the USBCNT 113 are control circuits for USB devices attached to the USB connectors of the PC 1.

[Wireless Device 200]

A description will be given of the hardware configuration of the wireless device 200 embedded in the PC 1. The wireless device 200 includes an encoder processor 202, a main memory 203, a WLAN 204, a NAND flash memory 206, an SPI-ROM 207, and a docking mechanism 208.

The main memory 203, the NAND flash memory 206, and the SPI-ROM 207 are connected to the encoder processor 202 via a bus. The WLAN 204 is connected to the encoder processor 202 via a USB (i.e., Universal Serial Bus). The WLAN 204 is also connected to the antenna 205 to transmit image data from the PC 1 to the display 3 via a wireless LAN.

The encoder processor 202 is an example of a main processing circuit in the wireless device 200. The encoder processor 202 is a dedicated processor configured to operate with lower electric power than the CPU 101 and to perform processes for simpler functions than those performed by the CPU 101. Image data of the PC 1 are transferred from the PC 1 to the wireless device 200 via the HDMI 110 for input into the encoder processor 202. The encoder processor 202 compresses and encodes the image data, for example, followed by transmitting the image data via the WLAN 204 to the wireless device 300 (i.e., to the display 3).

The NAND flash memory 206 and the SPI-ROM 207 may store programs for execution by the encoder processor 202 to perform a pairing setting process which will be described later. The encoder processor 202 executes the programs stored in these memory units to perform the pairing setting process.

The docking mechanism 208 is a connector configured to engage with a docking mechanism 308 provided in the wireless device 300 illustrated in FIG. 2. The docking mechanism 208 has a plurality of terminals for establishing electrical coupling between the wireless device 200 and the wireless device 300 when the docking mechanism 208 is physically coupled (i.e., engaged) with the docking mechanism 308. This coupling enables the transmission of a pairing request signal (which will hereinafter be referred to as a "pairing signal") from the wireless device 200 to the wireless device 300.

[Hardware Configuration of Display 3 Including Wireless Device 300]

In the following, a description will be given of the hardware configuration of the display 3 including the wireless device 300 by referring to FIG. 2.

The hardware configuration of the wireless device 300 embedded in the display 3 is the same as or similar to the hardware configuration of the wireless device 200. The wireless device 300 includes a decoder processor 302, a main memory 303, a WLAN 304, a NAND flash memory 306, an SPI-ROM 307, and a docking mechanism 308.

The main memory 303, the NAND flash memory 306, and the SPI-ROM 307 are connected to the decoder processor 302 via a bus. The WLAN 304 is coupled to the decoder processor 302 via a USB. The WLAN 304 is also connected to the antenna 305 to receive image data from the PC 1 via a wireless LAN.

The decoder processor 302 is an example of a main processing circuit in the wireless device 300. The decoder processor 302 is a dedicated processor configured to operate with lower electric power than the CPU 101 and to perform processes for simpler functions than those performed by the CPU 101. This arrangement serves to reduce the weight of the portable display 3. The decoder processor 302 may decompress and decode the image data received from the wireless device 200 (i.e., from the PC 1).

The NAND flash memory 306 and the SPI-ROM 307 may store programs for execution by the decoder processor 302 to perform a pairing setting process which will be described later. The decoder processor 302 executes the programs stored in these memory units to perform the pairing setting process.

The docking mechanism 308 is a connector configured to engage with the docking mechanism 208 provided in the wireless device 200. Physical coupling (i.e., docking) between the PC 1 and the display 3 through the docking mechanisms 208 and 308 causes the PC 1 and the display 3 to be electrically connected to each other, thereby allowing a pairing signal for requesting a pairing process to be transmitted from one of the PC 1 and the display 3 to the other. In the present embodiment, the pairing signal is transmitted to the PC 1 from the display 3 having a pairing button disposed thereon.

The docking mechanism 308 of the present embodiment includes two docking parts which are disposed on the long side and the short side, respectively, of the rectangular case of the display 3. This arrangement allows the display 3 to be placed either in landscape orientation or in portrait orientation as desired relative to the PC 1, thereby providing enhanced user convenience. It may be noted, however, that it suffices for the docking mechanism 308 to be disposed on at least one of the long side and the short side of the display 3.

The wireless device 300 includes an LCD (liquid crystal display) panel 309 and a pairing button 310. The LCD panel 309 displays, on a screen, image data decoded by the decoder processor 302

The pairing button 310 is a physical button disposed on the case of the display 3. A user presses the pairing button 310 to request a pairing process. Pressing of the button causes a pairing signal for requesting a pairing process to be produced. In place of the pairing button 310, a software button 311 may be displayed on the screen of the LCD panel 309. In such a case, a user touches the software button 311 to request a pairing process. Provision of two or more buttons on the wireless device to be paired may end up confusing user button operations. Because of this, it is preferable for the display 3 to have only one of the pairing button 310 and the software button 311.

The hardware configuration of the PC 1 including the wireless device 200 and the hardware configuration of the display 3 including the wireless device 300 according to the present embodiment have been described heretofore. In the following, a description will be given of the functions and operations of the wireless device 200 and the wireless device 300 with respect to a first embodiment, a variation of the first embodiment, and a second embodiment in this order.

First Embodiment

Figure 3:
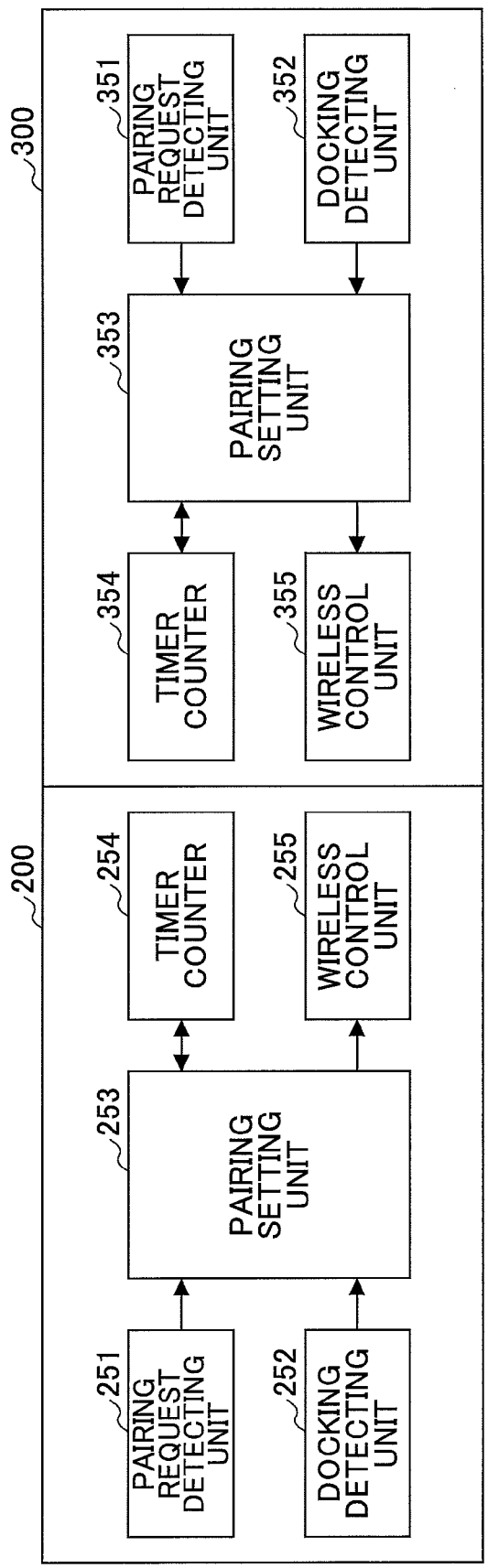
FIG. 3 is a drawing illustrating an example of the functional configuration of wireless devices according to a first embodiment.

A description will be given, by referring to FIG. 3, of an example of the functional configuration of the wireless devices 200 and 300 which form the pairing apparatus of the first embodiment. FIG. 3 is a drawing illustrating an example of the functional configuration of the wireless devices 200 and 300 according to the first embodiment.
[Functional Configuration of Wireless Device]

The wireless device 200 includes a pairing request detecting unit 251, a docking detecting unit 252, a pairing setting unit 253, a timer counter 254, and a wireless control unit 255. Similarly, the wireless device 300 includes a pairing request detecting unit 351, a docking detecting unit 352, a pairing setting unit 353, a timer counter 354, and a wireless control unit 355. In the first embodiment, the wireless devices 200 and 300 have the same functional configuration.

The pairing request detecting unit 251 detects a request for pairing. Specifically, the pairing request detecting unit 251 detects a pairing signal. The pairing signal is set to LOW upon the pairing button 310 being pressed. The pairing signal is kept in the HIGH state while the pairing button 310 is not pressed.

The docking detecting unit 252 detects the docking (i.e., coupling or engaging) of the wireless devices 200 and 300 with each other. Specifically, the docking detecting unit 252 detects a docking signal indicative of the docked state (i.e., coupled or engaged state) of the wireless devices 200 and 300. In the present embodiment, the docking signal is set to LOW upon the wireless devices 200 and 300 being engaged with each other. The docking signal is kept in the HIGH state when the wireless devices 200 and 300 are not engaged with each other.

The pairing setting unit 253 performs a pairing setting process with respect to the PC 1 and the display 3 in response to the co-occurrence of the detection of a request for pairing and the detection of docking between the PC 1 and the display 3.

The timer counter 254 measures time to determine a point in time at which the pairing signal is detected. The wireless control unit 255 controls the wireless communication of data such as images via a wireless LAN.

The functions of the units constituting the wireless device 300 are the same as the functions of the units constituting the wireless device 200, and a description thereof will be omitted. It may be noted that the functions of the pairing request detecting unit 251, the docking detecting unit 252, and the pairing setting unit 253 are implemented by the encoder processor 202. Further, the functions of the pairing request detecting unit 351, the docking detecting unit 352, and the pairing setting unit 353 are implemented by the decoder processor 302.

[Outputting of Signals]

Figure 4:
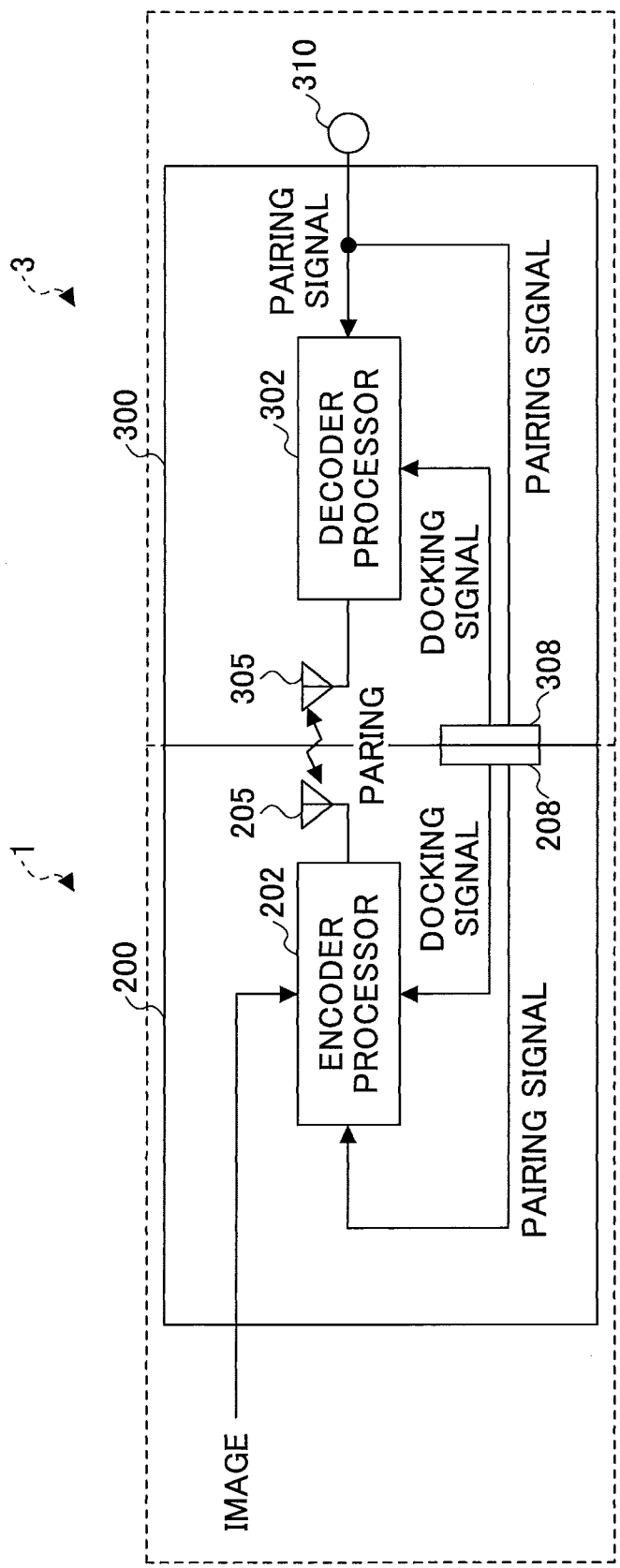
FIG. 4 is a drawing illustrating the docking and signals of the wireless devices according to the first embodiment.

In the following, a description will be given of the signals produced upon the docking of the wireless devices 200 and 300 according to the first embodiment. FIG. 4 is a drawing illustrating the signals produced upon the docking of the wireless devices 200 and 300 according to the first embodiment.

Pressing the pairing button 310 disposed on the display 3 causes a pairing signal in the LOW state to be produced and transmitted. In FIG. 4, the PC 1 and the display 3 are physically docked (i.e., engaged) with each other through the docking mechanisms 208 and 308. In this state, the pairing signal is applied to the decoder processor 302. The pairing signal is also transmitted to the PC 1 that is electrically connected through the docking mechanisms 208 and 308, thereby being applied to the encoder processor 202.

In this manner, physical docking (i.e., engagement) of the PC 1 with the display 3 through the docking mechanisms 208 and 308 allows the pairing signal to be transmitted from the display 3 to the PC 1 upon pressing the pairing button 310. This arrangement allows the pairing setting process which will be described below to be simultaneously performed in both the wireless devices 200 and 300. A detailed description will be given below.
[Pairing Setting Process]

Figure 5:
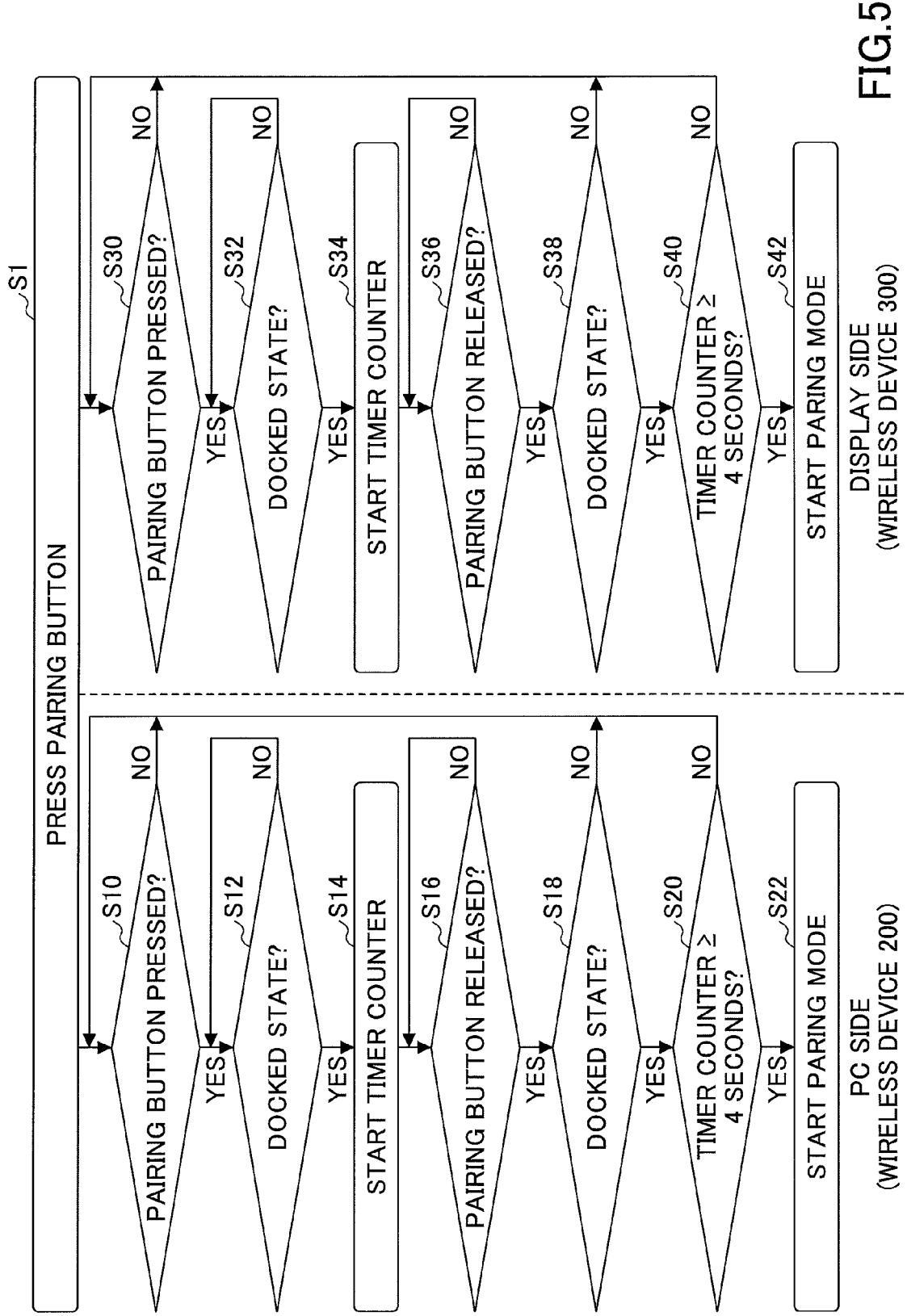
FIG. 5 is a flowchart illustrating an example of a pairing setting process according to the first embodiment.

In the following, a description will be given of an example of the pairing setting process according to the first embodiment by referring to FIG. 5. FIG. 5 is a flowchart illustrating an example of the pairing setting process according to the first embodiment. The left-hand side of FIG. 5 illustrates the pairing setting process performed by the wireless device 200 (i.e., at the PC 1). The right-hand side of FIG. 5 illustrates the pairing setting process performed by the wireless device 300 (i.e., at the display 3). As illustrated in FIG. 5, the pairing setting process performed by the wireless device 200 and the pairing setting process performed by the wireless device 300 are identical to each other, and are performed independently of each other at the wireless device 200 and the wireless device 300, respectively.

Upon pressing the pairing button 310 disposed on the display 3 (S1), a pairing signal in the LOW state is produced and applied to the decoder processor 302. Further, the pairing signal is immediately transmitted from the display 3 to the PC through the docking mechanisms 208 and 308 to be applied to the encoder processor 202.

Accordingly, the start time of the pairing setting process by the wireless device 200 is the same as the start time of the pairing setting process by the wireless device 300. Further, the fact that the same process is performed by the wireless devices 200 and 300 allows the program modules (i.e., a set of programs) for the pairing setting process to be the same between the wireless devices 200 and 300. In the following, a description will be given of the pairing setting process performed by the wireless device 200, which is illustrated on the left-hand side of FIG. 5.

Upon pressing the pairing button 310 (step S1), the encoder processor 202 determines in step S10 whether the pairing button 310 is pressed. The encoder processor 202 repeats the process in step S10 until the pressing of the pairing button 310 is detected.

Upon detecting the pressing of the pairing button 310, the encoder processor 202 checks in step S12 whether the docking state is in existence. The encoder processor 202 repeats the process in step S12 until the docking state is detected.

Upon detecting the docking state of the wireless devices 200 and 300 based on the docking signal, the encoder processor 202 starts the timer counter 254 in step S14.

The encoder processor 202 then checks in step S16 whether the pairing button 310 is released. The encoder processor 202 repeats the process in step S16 until the release of the pairing button 310 is detected. Upon detecting the release of the pairing button 310 based on the pairing signal, the encoder processor 202 proceeds to step S18.

In the case of determining based on the docking signal that the wireless devices 200 and 300 are not in the docked state, the encoder processor 202 returns to step S10. In this manner, the encoder processor 202 checks the physical docking state of the wireless devices 200 and 300. In the case of detecting the absence of physical docking, the encoder processor 202 does not accept the press event of the pairing button 310, i.e., does not perform a pairing process.

In the case of detecting the presence of physical docking of the wireless devices 200 and 300, the encoder processor 202 checks in step S20 whether the count of the timer counter 254 indicates 4 seconds or longer. Namely, a check is made as to whether the pairing button 310 has been released after a continuous pressing of 4 seconds or longer. Upon determining that the pairing button 310 has not been continuously pressed for 4 seconds or longer, the encoder processor 202 returns to step S10 to wait for a next event. A length of 4 seconds is an example of a threshold for determining whether the button is continuously pressed for a sufficiently long time. The threshold length may alternatively be 5 seconds, 6 seconds, or any proper length.

In the case of detecting a count indicative of 4 seconds or longer in step S20, the encoder processor 202 chooses to perform a pairing process, and starts a pairing mode in step S22 (i.e., performs a pairing setting process).

The pairing setting process performed by the wireless device 300 in step S30 to step S42 is the same as the pairing setting process performed by the wireless device 200 in step S10 to step S22, and a description thereof will be omitted.

The pairing setting processes performed at the wireless devices 200 and 300 independently of each other cause both the wireless devices 200 and 300 to enter a pairing mode, thereby starting a pairing process such as Wi-Fi setup. Specifically, the PC 1 (serving as an access point) is caused to enter a pairing mode dedicated for setup, so that the display 3 (serving as a station) in the pairing mode initiates a connection with the PC 1 (i.e., access point) to allow a setup operation to be performed at the display 3. After the setup operation, the display 3 is able to display data such as images transmitted from the PC 1.

It may be noted that, in addition to the processes illustrated in FIG. 5, a further check may be made as to whether the count of the timer counter 254 exceeds 10 seconds, for example. Provision may be made such that the detection of the count of the timer counter 254 exceeding 10 seconds causes a mode different from the pairing mode (e.g., a mode for upgrading the firmware) to be started.

It may be noted that, in addition to the processes illustrated in FIG. 5, a further check may be made as to whether the count of the timer counter 254 exceeds 30 seconds, for example. Provision may be made such that the detection of the count of the timer counter 254 exceeding 30 seconds causes to be performed an error handling process that forces the setup operation (i.e., pairing process) to close, for example.

A description has heretofore been given of an example of the pairing setting processes performed, with respect to the PC 1 and the display 3, by the wireless devices 200 and 300 of the pairing apparatus of the first embodiment.

With the configuration having pairing buttons on both wireless devices to be paired, a user needs to press both buttons on the wireless devices in order to perform pairing based on the push-button method. In such a case, the pressing of the button on one wireless device may be slightly delayed or advanced from the pressing of the button on the other wireless device. A pairing method that takes into account such a delay may allow a time period such as a few minutes to be set for accepting a button operation (i.e., a time length allowed to pass before a time-out error for pairing), and allows a second pairing process to be performed after the lapse of this time period. It is cumbersome for a user to locate the buttons on the devices if the user has never used these devices. There is a pairing mechanism that pairs devices while keeping the radio-field intensity of these devices in the reduced state for a few minutes before a time-out error for pairing occurs. However, some devices employing a push-button method require strong radio-field intensity for pairing to be performed, which necessitates that the devices to be paired are placed in close proximity to each other. It is difficult to discriminate between the legitimate use of devices by legitimate user and the illegitimate use of devices by illegitimate user during the few minutes in which button operations are accepted. The longer the time period for accepting the button operation is, the lower the security of the pairing process becomes.

According to the pairing apparatus of the present embodiment, a user is able to perform a pairing process by pressing only the pairing button 310 disposed on the display 3 while the wireless devices 200 and 300 are docked with each other. This arrangement streamlines the user operation for pairing.

Pressing the pairing button 310 once while the wireless devices 200 and 300 are docked with each other causes a pairing signal to be transmitted from the display 3 (i.e., from the wireless device 300) to the PC 1 (i.e., to the wireless device 200) via the docking mechanisms 208 and 308. This arrangement ensures that no time delay occurs between the detection of a pairing signal by the encoder processor 202 of the wireless device 200 and the detection of a pairing signal by the decoder processor 302 of the wireless device 300. The time limit of the pairing process (setup) before detecting a time-out error while keeping a distance for a stable radio-field intensity can thus be shortened. For example, the time length for detecting a time-out error for setup can be significantly reduced from a few minutes as used in the related-art configuration to a few seconds in the present embodiment. Such a shortening of the time limit for accepting a button operation serves to improve the security of a pairing process.

The pairing process of the present embodiment accepts a request for pairing when the pairing button 310 is pressed while the wireless devices 200 and 300 are docked with each other. In other words, the detection of a pairing signal caused by the pressing of the pairing button 310 on the display 3 does not result in the execution of a pairing process if the wireless devices 200 and 300 are not docked with each other.

The reason why the state of docking is checked in steps S12 and S32 is because there is a need to wait for the detection of a docked state before performing a pairing process due to the fact that the undocked state of the wireless devices 200 and 300 indicates the absence of a pairing request from a user. Even in the absence of the docked state of the wireless devices 200 and 300, the decoder processor 302 of the display 3 detects a pairing signal. The decoder processor 302 thus cannot determine the state of docking solely based on the detection of a pairing signal. This is the reason why the state of docking is checked in step S32.

It may be noted that a pairing signal is not transmitted from the display 3 to the PC 1 when the wireless devices 200 and 300 are not in the docked state. The encoder processor 202 can thus properly interpret the absence of a pairing signal as an indication of either the absence of a docked state or no pressing of the pairing button 310. In other words, the wireless device 200 can determine, solely based on the check of a pairing signal in step S10, if a user is not requesting pairing. The wireless device 200 can then wait for a pairing request from the user before performing a pairing process. Namely, a check of the docking state performed in step S32 cannot be omitted, but a check of the docking state performed in step S12 can be omitted. The provision of the check in step S12 for the wireless device 200 in the same or similar manner as the check in step S32 performed by the wireless device 300 ensures that the processes performed in the wireless devices 200 and 300 are the same, thereby reducing labor and time required for the product development.

The state of docking is also checked in step S18 and step S38. This is because the fact that the display 3 is physically separated from the PC 1 indicates the user's intention not to request pairing, in which case the pressing of the pairing button 310 should be ignored. These docking-state checks in steps S18 and S38 cannot be omitted.

[Variation]

Figure 6:
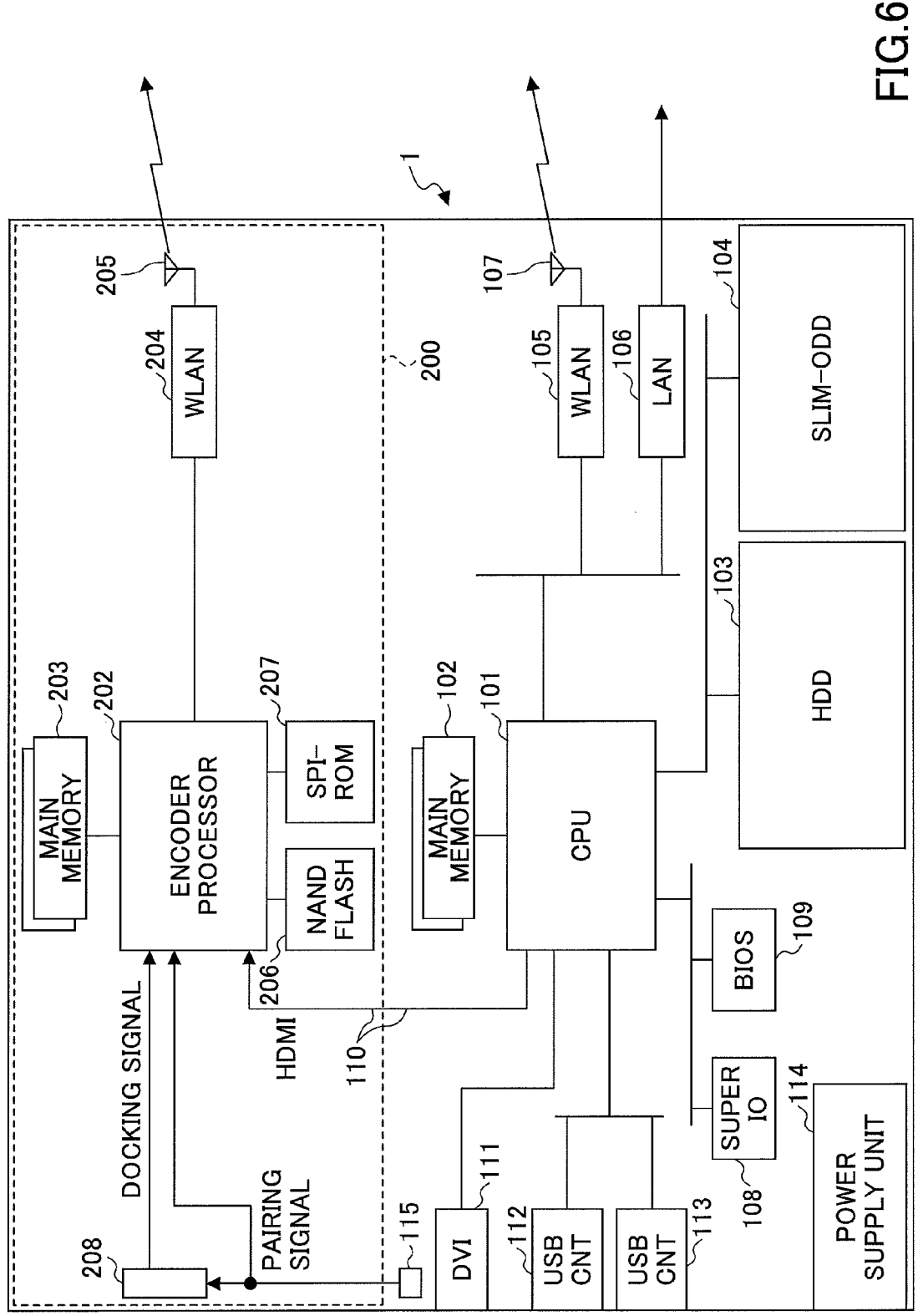
FIG. 6 is a drawing illustrating an example of the hardware configuration of a PC according to a variation.
Figure 7:
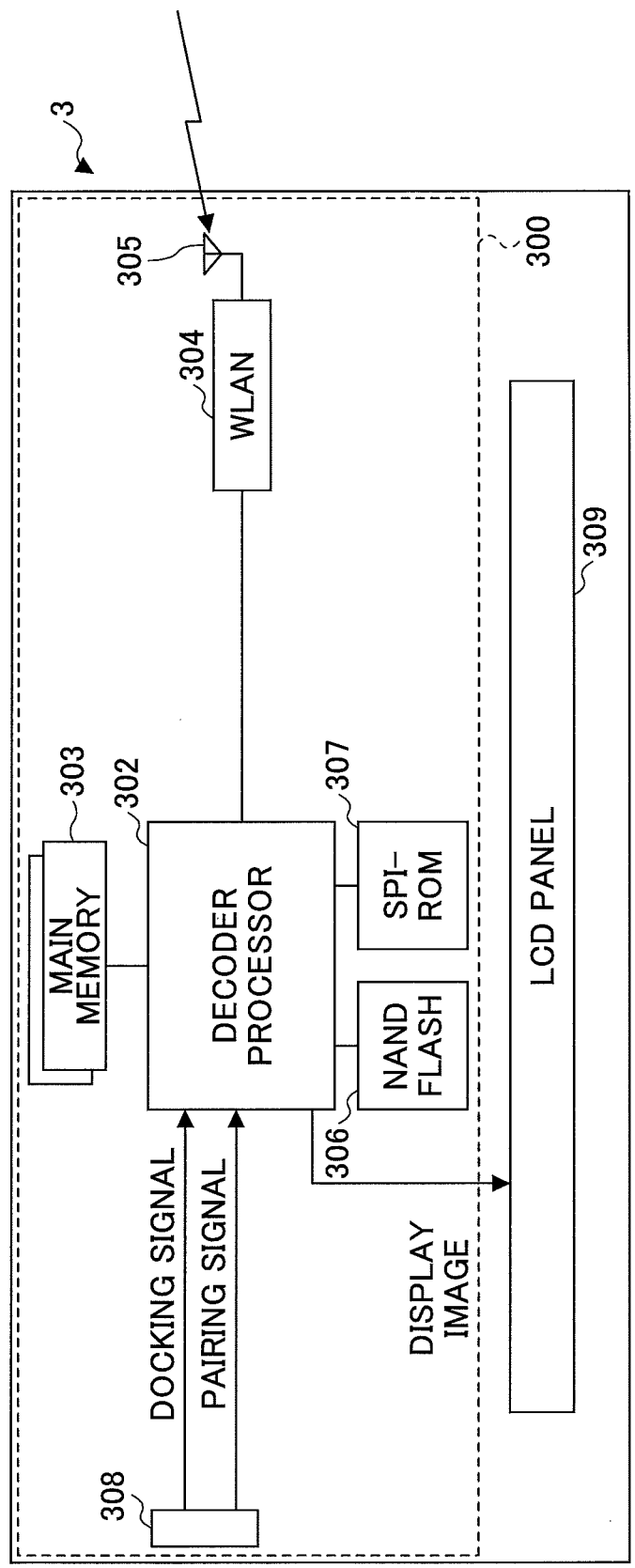
FIG. 7 is a drawing illustrating an example of the hardware configuration of a display according to a variation.

In the first embodiment, the pairing button 310 is disposed on the display 3. In this variation, the pairing button 310 is disposed on the PC 1 rather than on the display 3. FIG. 6 illustrates an example of the hardware configuration of the PC 1 according to the variation. FIG. 7 illustrates an example of the hardware configuration of the display 3 according to the variation.

Figure 8:
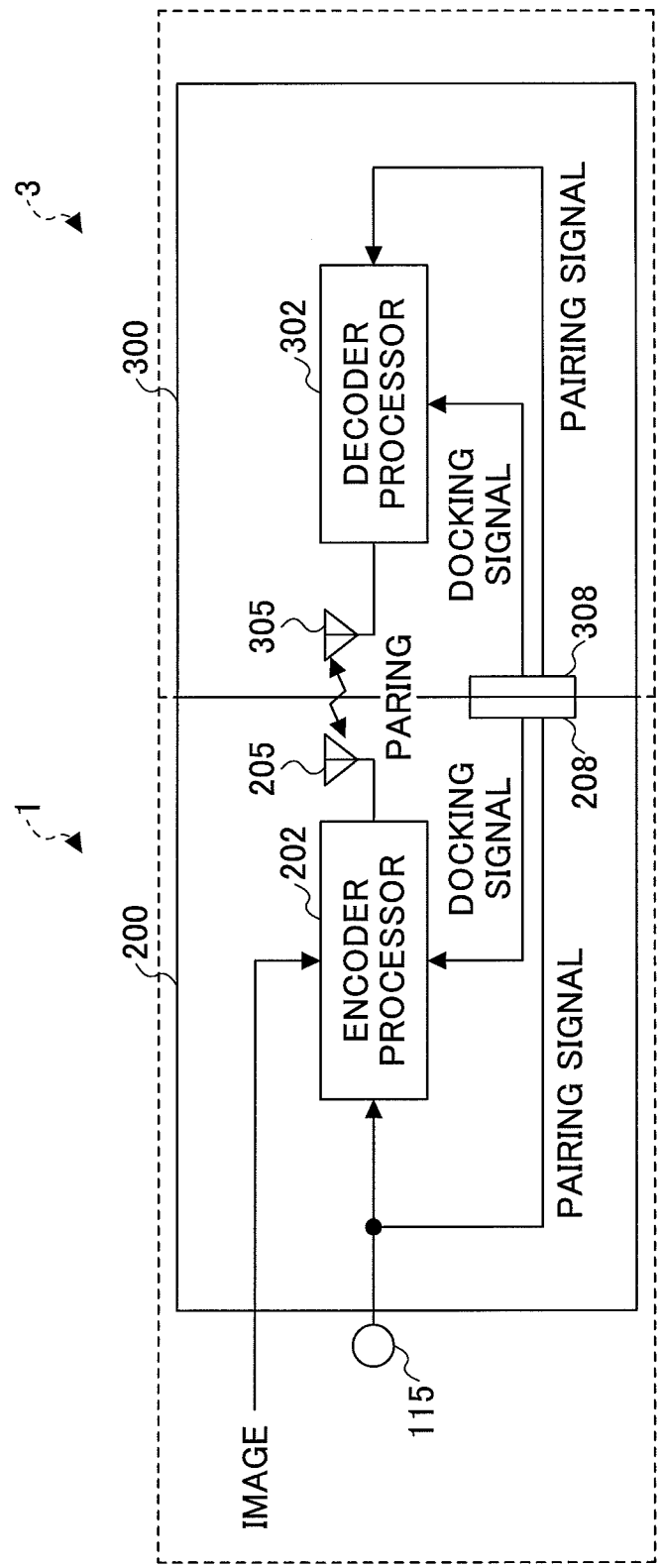
FIG. 8 is a drawing illustrating the docking and signals of the wireless devices according to the variation.

The hardware configuration of the PC 1 and the hardware configuration of the display 3 of this variation differ from the hardware configuration of the PC 1 (FIG. 1) and the hardware configuration of the display 3 (FIG. 2) of the first embodiment in that a pairing button 115 is disposed on the PC 1 while no pairing button is disposed on the display 3. In the variation, the direction of transmission of the pairing signal is reversed from the first embodiment as illustrated in FIG. 8. Namely, the pairing signal is transmitted from the PC 1 to the display 3. The pairing setting process of this variation is the same as or similar to the pairing setting process of the first embodiment.

It may be noted that a pairing button is preferably disposed on only one of the PC 1 and the display 3. Provision of pairing buttons on both the PC 1 and the display 3 may cause pairing signals to be output from both of the devices, which may undesirably complicate the processing of a pairing request.

Second Embodiment

Figure 9:
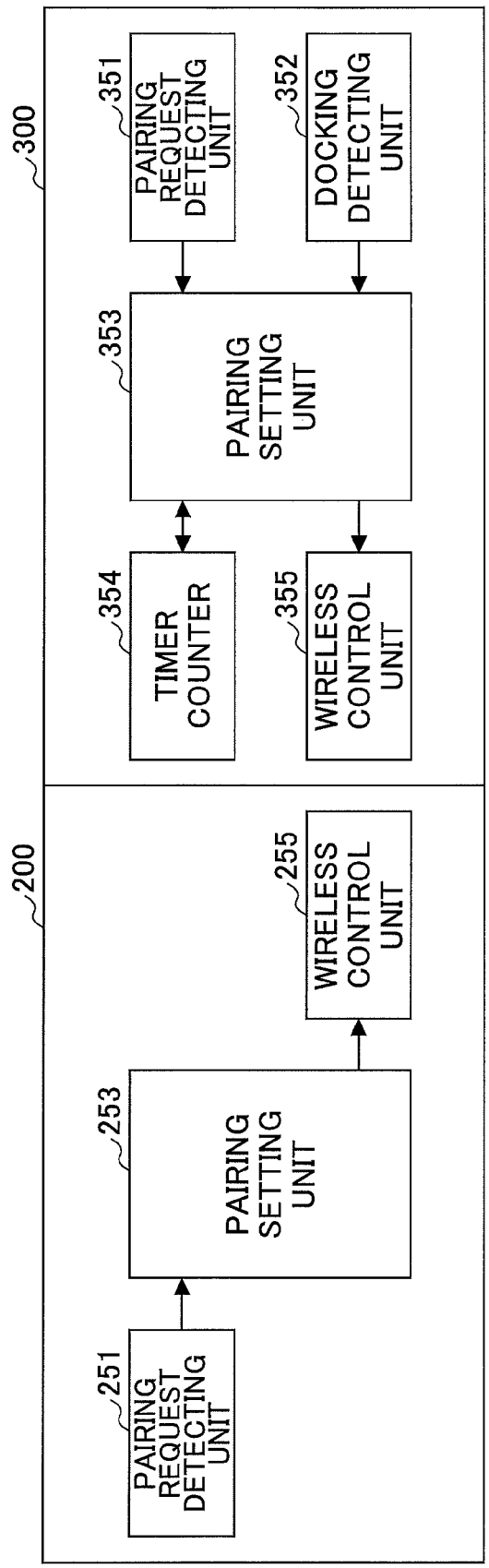
FIG. 9 is a drawing illustrating an example of the functional configuration of wireless devices according to a second embodiment.

A description will be given, by referring to FIG. 9, of an example of the functional configuration of the wireless devices 200 and 300 which form the pairing apparatus of the second embodiment. FIG. 9 is a drawing illustrating an example of the functional configuration of the wireless devices 200 and 300 according to the second embodiment. It may be noted that the hardware configurations of the PC 1 and the display 3 of the second embodiment are the same as or similar to the hardware configurations of the PC 1 and the display 3 of the first embodiment, and a description thereof will be omitted.

[Functional Configuration of Wireless Device]

The wireless device 200 includes the pairing request detecting unit 251, the pairing setting unit 253, and the wireless control unit 255. The functional configuration of the wireless device 200 of the second embodiment differs from the functional configuration of the wireless device 200 of the first embodiment illustrated in FIG. 3 in that the docking detecting unit 252 and the timer counter 254 are not provided.

The wireless device 300 includes the pairing request detecting unit 351, the docking detecting unit 352, the pairing setting unit 353, the timer counter 354, and the wireless control unit 355. The functional configuration of the wireless device 300 of the second embodiment is the same as the functional configuration of the wireless device 300 of the first embodiment illustrated in FIG. 3.

[Outputting of Signals]

Figure 10:
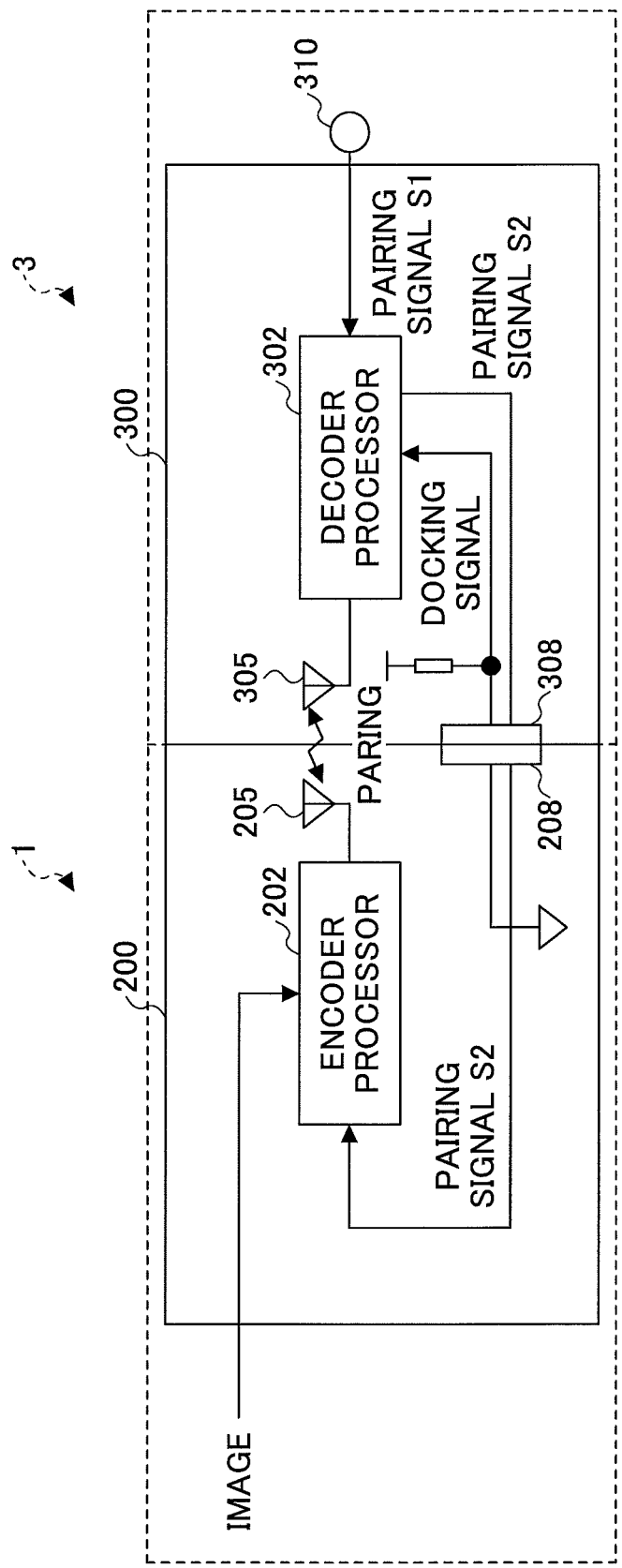
FIG. 10 is a drawing illustrating the docking and signals of the wireless devices according to the second embodiment.

In the following, a description will be given of the signals produced upon the docking of the wireless devices 200 and 300 according to the second embodiment. FIG. 10 is a drawing illustrating the signals produced upon the docking of the wireless devices 200 and 300 according to the second embodiment.

In the second embodiment also, pressing the pairing button 310 disposed on the display 3 causes a pairing signal in the LOW state to be produced and transmitted. The transmitted pairing signal is illustrated as a pairing signal S1 in FIG. 10. The pairing signal S1 is applied to the decoder processor 302. In the present embodiment, the pairing signal 1 is not transmitted to the PC 1.

The decoder processor 302 receiving the pairing signal S1 determines whether to perform a pairing process. In the case of determining that a pairing process is to be performed by a pairing setting process, which will be described, the decoder processor 302 produces a pulse signal (which will hereinafter be referred to as a "pairing signal S2"). The pairing signals S1 and S2 are examples of one or more signals for requesting pairing.

In FIG. 10, the PC 1 and the display 3 are physically docked (i.e., engaged) with each other through the docking mechanisms 208 and 308. In this state, the pairing signal S2 is transmitted from the decoder processor 302 to the PC 1 via the docking mechanisms 208 and 308, and is applied to the encoder processor 202. The decoder processor 302 having transmitted the pairing signal S2 and the encoder processor 202 having received the pairing signal S2 enter a pairing mode.

It may be noted that in the second embodiment, it is the decoder processor 302 of the display 3 that determines whether to perform pairing. Because of this, the docking signal indicative of the state of docking between the docking mechanisms 208 and 308 is only applied to the decoder processor 302, without being applied to the encoder processor 202.

[Pairing Setting Process of Wireless Device]

Figure 11:
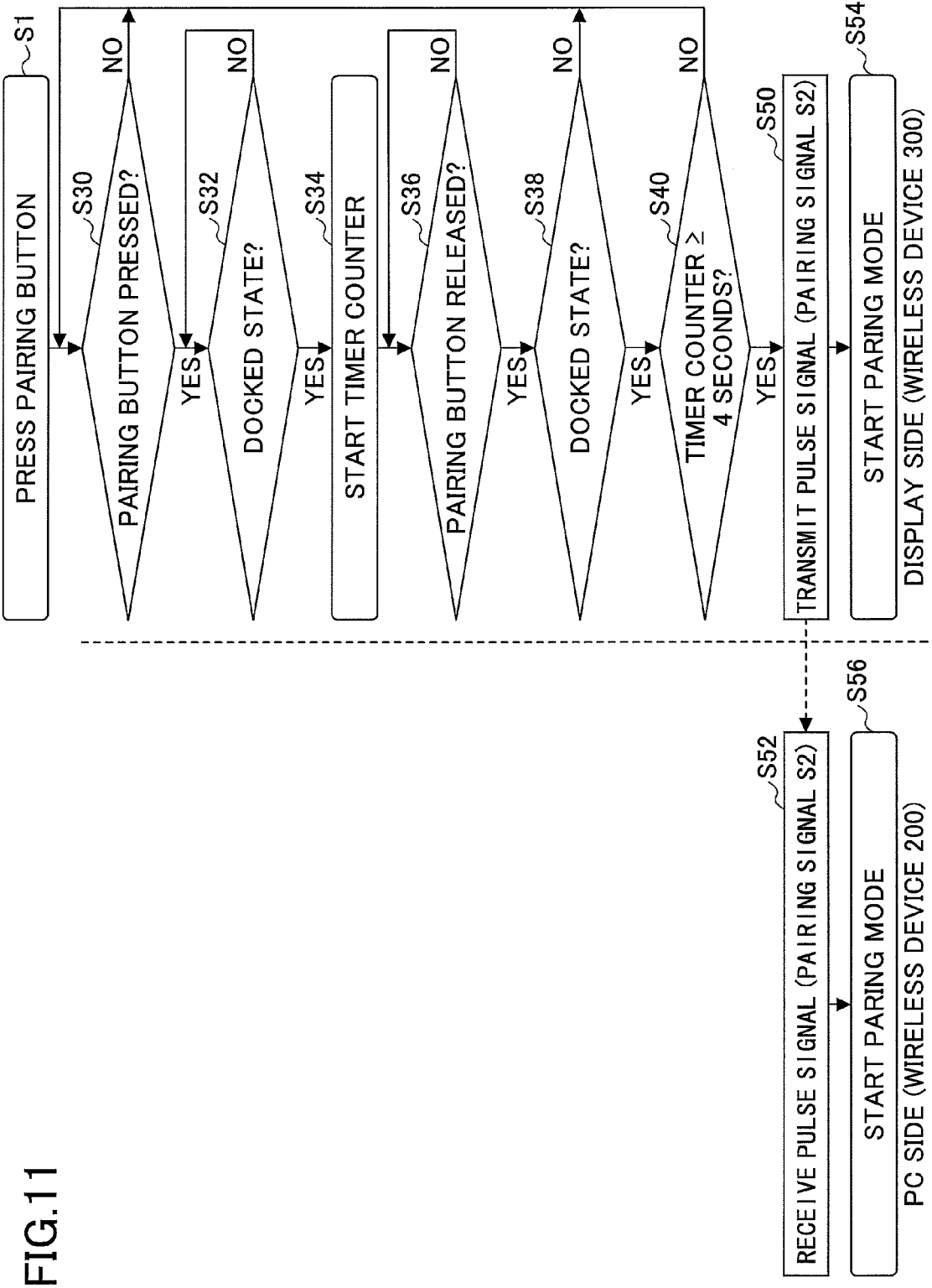
FIG. 11 is a flowchart illustrating an example of a pairing setting process according to the second embodiment.
Figure 12:
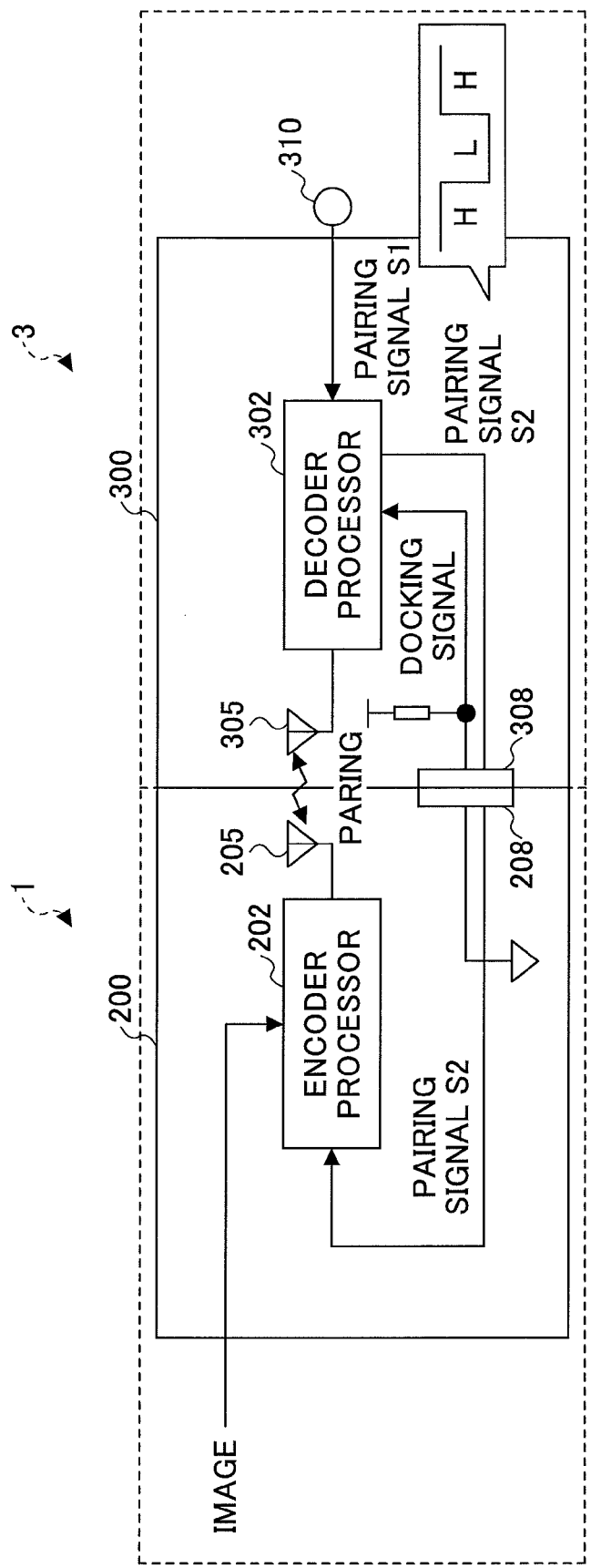
FIG. 12 is a drawing illustrating the pairing setting process of the second embodiment.

In the following, a description will be given of an example of the pairing setting process performed by the wireless devices 200 and 300 of the second embodiment by referring to FIG. 11 and FIG. 12. FIG. 11 is a flowchart illustrating an example of the pairing setting process performed by the wireless devices 200 and 300 according to the second embodiment. FIG. 12 is a drawing illustrating the pairing setting process of the second embodiment. The left-hand side of FIG. 11 illustrates the pairing setting process performed by the wireless device 200 of the PC 1, and the right-hand side of FIG. 11 illustrates the pairing setting process performed by the wireless device 300 of the display 3. The pairing setting process performed by the wireless device 200 is distinct from the pairing setting process performed by the wireless device 300.

Upon pressing the pairing button 310, the decoder processor 302 determines in step S30 whether the pairing button 310 is pressed. The decoder processor 302 repeats the process in step S30 until the pressing of the pairing button 310 is detected.

The decoder processor 302 detects the pressing of the pairing button 310 in response to receiving the pairing signal S1, and, then, repeats checking the state of docking in step S32 until the docked state is detected.

Upon detecting the docking state of the wireless devices 302 and 300 based on the docking signal, the decoder processor 302 starts the timer counter 354 in step S34.

The decoder processor 302 then checks in step S36 whether the pairing button 310 is released. The decoder processor 302 repeats the process in step S36 until the release of the pairing button 310 is detected.

Upon detecting the release of the pairing button 310, the decoder processor 302 checks the state of docking in step S38. In the case of determining based on the docking signal that the wireless devices 302 and 300 are not in the docked state, the decoder processor 302 returns to step S30. The arrangement is made as described above such that the connection state of the wireless devices 200 and 300 is detected, and the pressing of the pairing button 310 is ignored in the case of no connection (i.e., no physical docking).

In the case of detecting the presence of physical docking of the wireless devices 200 and 300, the decoder processor 302 checks in step S40 whether the count of the timer counter 354 indicates 4 seconds or longer. Namely, a check is made as to whether the pairing button 310 has been released after a continuous pressing of 4 seconds or longer. Upon determining that the count is not 4 seconds or longer, the decoder processor 302 returns to step S30 to wait for a next event.

In the case of detecting a count indicative of 4 seconds or longer in step S40, the decoder processor 302 chooses to perform a pairing process, and transmits the pairing signal S2 in step S50. As illustrated in FIG. 12, the pairing signal S2 is a pulse signal changing from High to Low to High as illustrated in FIG. 12. The pairing signal S2 produced by the decoder processor 302 is transmitted to the PC 1 via the docking mechanisms 208 and 308. The encoder processor 202 receives the transmitted pairing signal S2 in step S52.

The decoder processor 302, which has transmitted the pairing signal S2 in step S50, starts a pairing mode in step S54. The encoder processor 202, which has received the pairing signal S2 in step S52, starts a pairing mode in step S56.

A description has heretofore been given of an example of the pairing setting processes performed, with respect to the PC 1 and the display 3, by the wireless devices 200 and 300 of the pairing apparatus of the second embodiment. According to the pairing apparatus of the second embodiment, a user is able to perform a pairing process by pressing only the pairing button 310 disposed on the display 3 while the wireless devices 200 and 300 are docked with each other. This arrangement streamlines the user operation for pairing. Further, the time length for detecting a time-out error in the setup operation can be set to a short length. This arrangement serves to improve security for the pairing process.

In the pairing apparatus of the second embodiment, the wireless device 300 having the pairing button 310 is responsible for determining whether to perform a pairing setting process. Only when the wireless device 300 determines that a pairing setting process is to be performed, the wireless device 300 transmits the pairing signal S2 to the wireless device 200. Upon receiving the pairing signal S2, thus, the wireless device 200 can simply perform the pairing setting process. Because of this, the wireless device 200 of the present embodiment does not have to be provided with the functions of the docking detecting unit 252 and the timer counter 254. Processing can be streamlined in the present embodiment because time measurement by the timer counter 254 and the detection of a docking signal are not necessary in the device that has no pairing button.

A pairing apparatus for wireless devices subjected to pairing and a method for performing pairing have heretofore been described by referring to the embodiments. The present invention is not limited to these embodiments, but various variations and modifications may be made without departing from the scope of the present invention. These embodiments and variations may be combined with each other as long as they do not contradict each other.

According to at least one embodiment, operations performed in the pairing of wireless devices are streamlined.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:
1. A pairing apparatus, comprising:
first and second wireless devices, each of which has a docking mechanism for physically docking the first and second wireless devices with each other;
wherein each of the first and second wireless devices includes:
a processor; and
a memory configured to store a program,
wherein the processor is configured to execute the program to perform functions of:
a pairing request detecting unit configured to detect a request for pairing, the request for pairing including pressing of a pairing button and releasing of the pairing button;
a docking detecting unit configured to detect docking of the first and second wireless devices; and
a pairing setting unit configured to perform a pairing setting process for pairing the first and second wireless devices, in response to the request for pairing,
wherein a first check as to whether the first and second wireless devices are in a docked state is made in response to the pressing of the pairing button, and a second check as to whether the first and second wireless devices are in a docked state is made in response to the releasing of the pairing button, the second check being separate and distinct from the first check, and the request for pairing is made from one of the first and second wireless devices to the other one of the first and second wireless devices upon both of the first check and the second check indicating that the first and second wireless devices are in the docked state.

2. The pairing apparatus as claimed in claim 1, wherein each of the first and second wireless devices measures a length of a time period during which the request for pairing is continuously detected, and the pairing setting unit of each of the first and second wireless devices performs the pairing setting process when the measured length is longer than a predetermined length.

3. The pairing apparatus as claimed in claim 2, wherein each of the first and second wireless devices measures the length of the time period during which the request for pairing is continuously detected only while the docking of the first and second wireless devices is detected.

4. A method for pairing first and second wireless devices, each of which has a docking mechanism for physically docking the first and second wireless devices with each other, comprising:
　detecting a request for pairing at each of the first and second wireless devices, the request for pairing including pressing of a pairing button and releasing of the pairing button;
　detecting docking of the first and second wireless devices at each of the first and second wireless devices;
　performing, at each of the first and second wireless devices, a pairing setting process for pairing the first and second wireless devices, in response to the request for pairing; and
　making a first check, in response to the pressing of the pairing button, as to whether the first and second wireless devices are in a docked state, and making a second check, in response to the releasing of the pairing button, as to whether the first and second wireless devices are in a docked state, the second check being separate and distinct from the first check, and making the request for pairing from one of the first and second wireless devices to the other one of the first and second wireless devices upon both of the first check and the second check indicating that the first and second wireless devices are in the docked state.

5. The method as claimed in claim 4, further comprising:
　measuring, at each of the first and second wireless devices, a length of a time period during which the request for pairing is continuously detected; and
　performing, at each of the first and second wireless devices, the pairing setting process when the measured length is longer than a predetermined length.

6. The method as claimed in claim 5, wherein the length of the time period during which the request for pairing is continuously detected is measured only while the docking of the first and second wireless devices is detected.

7. A non-transitory computer-readable recording medium having a program embodied therein for causing a computer to pair first and second wireless devices, each of which has a docking mechanism for physically docking the first and second wireless devices with each other, the program comprising:
　detecting a request for pairing at each of the first and second wireless devices, the request for pairing including pressing of a pairing button and releasing of the pairing button;
　detecting docking of the first and second wireless devices at each of the first and second wireless devices;
　performing, at each of the first and second wireless devices, a pairing setting process for pairing the first and second wireless devices, in response to the request for pairing; and
　making a first check, in response to the pressing of the pairing button, as to whether the first and second wireless devices are in a docked state, and making a second check, in response to the releasing of the pairing button, as to whether the first and second wireless devices are in a docked state, the second check being separate and distinct from the first check, and making the request for pairing from one of the first and second wireless devices to the other one of the first and second wireless devices upon both of the first check and the second check indicating that the first and second wireless devices are in the docked state.

8. The non-transitory computer-readable recording medium as claimed in claim 7, wherein the program further includes:
　measuring, at each of the first and second wireless devices, a length of a time period during which the request for pairing is continuously detected; and
　performing, at each of the first and second wireless devices, the pairing setting process when the measured length is longer than a predetermined length.

9. The non-transitory computer-readable recording medium as claimed in claim 8, wherein the length of the time period during which the request for pairing is continuously detected is measured only while the docking of the first and second wireless devices is detected.

* * * * *